(12) United States Patent
Li et al.

(10) Patent No.: US 10,518,983 B1
(45) Date of Patent: Dec. 31, 2019

(54) HIGHLY EFFICIENT AND INTELLIGENT DRUG AND PARENTERAL NUTRITION PRODUCT AUTOMATIC COLLATION AND REVERSION DEVICE

(71) Applicant: CHILDREN'S HOSPITAL OF FUDAN UNIVERSITY, Shanghai (CN)

(72) Inventors: Zhiping Li, Shanghai (CN); Jinmiao Lu, Shanghai (CN); Qin Li, Shanghai (CN); Guangfei Wang, Shanghai (CN); Yidie Huang, Shanghai (CN); Xiaoxia Li, Shanghai (CN)

(73) Assignee: CHILDREN'S HOSPITAL OF FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 16/395,332

(22) Filed: Apr. 26, 2019

(30) Foreign Application Priority Data

Dec. 5, 2018 (CN) .......................... 2018 1 14807550

(51) Int. Cl.
*B65G 47/68* (2006.01)
*B65G 43/08* (2006.01)

(52) U.S. Cl.
CPC ........... *B65G 47/682* (2013.01); *B65G 43/08* (2013.01); *B65G 2203/0258* (2013.01); *B65G 2203/041* (2013.01)

(58) Field of Classification Search
CPC ................. B65G 43/08; B65G 47/682; B65G 2203/0258
USPC ......................................................... 198/348
See application file for complete search history.

(56) References Cited

U.S. PATENT DOCUMENTS

| | | | |
|---|---|---|---|
| 5,141,065 A * | 8/1992 | Maxwell ................ | G01G 13/32 177/210 R |
| 2018/0133915 A1* | 5/2018 | Mantovani .............. | B26D 3/24 |
| 2019/0202642 A1* | 7/2019 | Schroader .............. | B65G 43/08 |

* cited by examiner

*Primary Examiner* — Gene O Crawford
*Assistant Examiner* — Lester Iii Rushin
(74) *Attorney, Agent, or Firm* — McClure, Qualey & Rodack, LLP

(57) ABSTRACT

The present invention discloses a highly efficient and intelligent drug and parenteral nutrition product automatic collation and reversion device, which comprises a feeding conveyor belt, a discharging conveyor belt, a returning conveyer belt and computer; and in the junction of the feeding conveyor belt, the discharging conveyor belt and the returning conveyer belt is provided an inspection module. In the present invention, drug dispatch is configured to be done just as a production line, by providing a weighing scale to measure the weight of drugs, and four cameras to assist in identifying drugs to check whether correct drugs are dispatched, and in case that any errors detected, the wrong drugs will be sent back to the original position for inspection, which improves efficiency and accuracy of drug dispatch and reduces manpower cost.

6 Claims, 6 Drawing Sheets

HIGHLY EFFICIENT AND INTELLIGENT DRUG AND PARENTERAL NUTRITION PRODUCT AUTOMATIC COLLATION AND REVERSION DEVICE

TECHNICAL FIELD

The present invention relates to the technical field of drug inspection, especially to a highly efficient and intelligent drug and parenteral nutrition product automatic collation and reversion device.

BACKGROUND TECHNOLOGY

With the development of society and improvement of living standards, people are in increasing need of medical health. Consequently, hospitals are always crowded with patients; usually patients will receive a list of prescribed medicines after treated by a doctor, pay the bill and go to the pharmacy to claim the medicines. Currently drug dispatch work is done manually in the pharmacy, by finding corresponding drugs, checking with the prescriptions and sending to the patients. In this way, it takes much manpower to check, which is also susceptible to errors and of low efficiency.

DETAILED DESCRIPTION OF THE PRESENT INVENTION

The object of the present invention is to provide a highly efficient and intelligent drug and parenteral nutrition product automatic collation and reversion device to address the problems proposed in the background technology.

To achieve the above objective, the present invention provides a technical solution as follows: an highly efficient and intelligent drug and parenteral nutrition product automatic collation and reversion device comprises a feeding conveyor belt, a discharging conveyor belt, a returning conveyer belt and computer; and in the junction of the feeding conveyor belt, the discharging conveyor belt and the returning conveyer belt is provided an inspection module, which comprises a supporting structure, and at four corners of the supporting structure are provided 4 cameras; on the first layer of the supporting structure are provided several drive rollers, to one side of the said drive rollers are connected the drive motor, and the assembly of the drive rollers is connected to the circular toothed disk on the second layer of the supporting structure; on top of the toothed disk is provided the weighing scale; top part of the weighing scale is connected to the scale pan, and to the lower part of the weighing scale is provided a stretchable device, which goes through the toothed disk and is connected to the bottom of the supporting structure; one side of the toothed disk is connected to a servo motor.

As a preferred embodiment, on the scale pan are provided several sawtooth shaped strips, with each of them placed between two neighboring drive rollers.

Preferably, it is possible to adjust number of drive rollers and sawtooth-shaped strips by the dimension of the drug box to be inspected.

As a preferred embodiment, the number of the drive rollers is 7 and the number of the sawtooth-shaped strips is 6.

As a preferred embodiment, the angle of the cameras may be adjusted and orient to the center of the drive rollers.

As a preferred embodiment, between the returning conveyor belt and the inspection module is provided a fan-shaped gradient intersection part.

As a preferred embodiment, the toothed disk may rotate 90 degree clockwise or counterclockwise.

Compared with the prior art, beneficial effects of the present invention are as follow: in the present invention, drug dispatch is configured to be done just as a production line, by providing a weighing scale to measure the weight of drugs, and four cameras to assist in identifying drugs to check whether correct drugs are dispatched, and in case that any errors are detected, the wrong drugs will be sent back to the original position for inspection, which improves efficiency and accuracy of drug dispatch and reduces manpower cost.

DETAILED DESCRIPTION OF THE DRAWINGS

Figure 1:
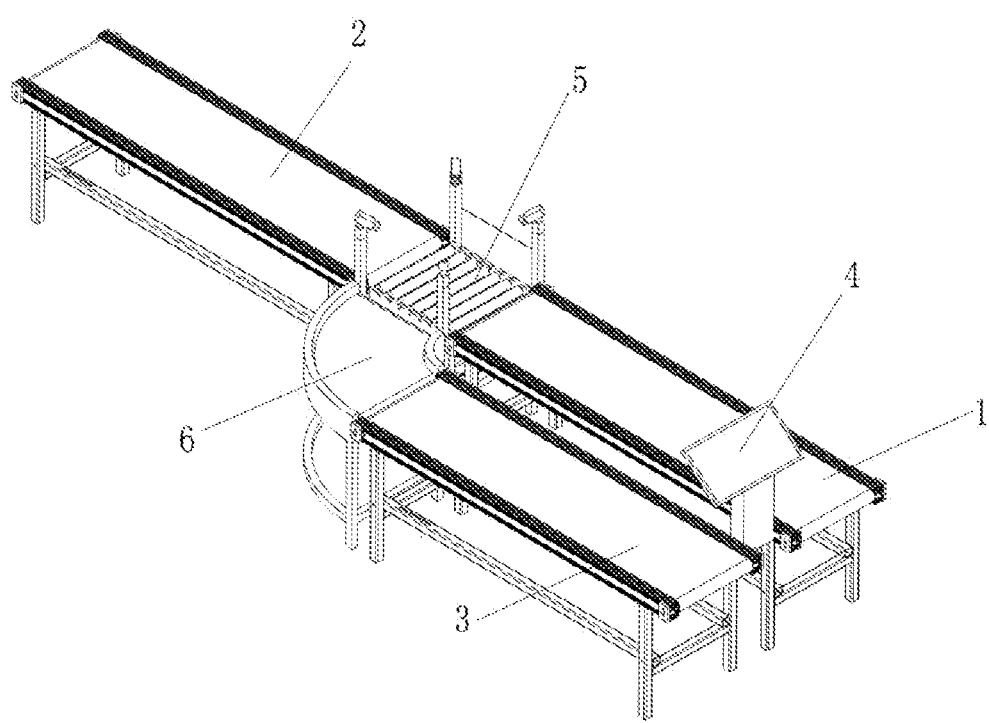
FIG. 1 shows the perspective view of the device according to the present invention.
Figure 2:
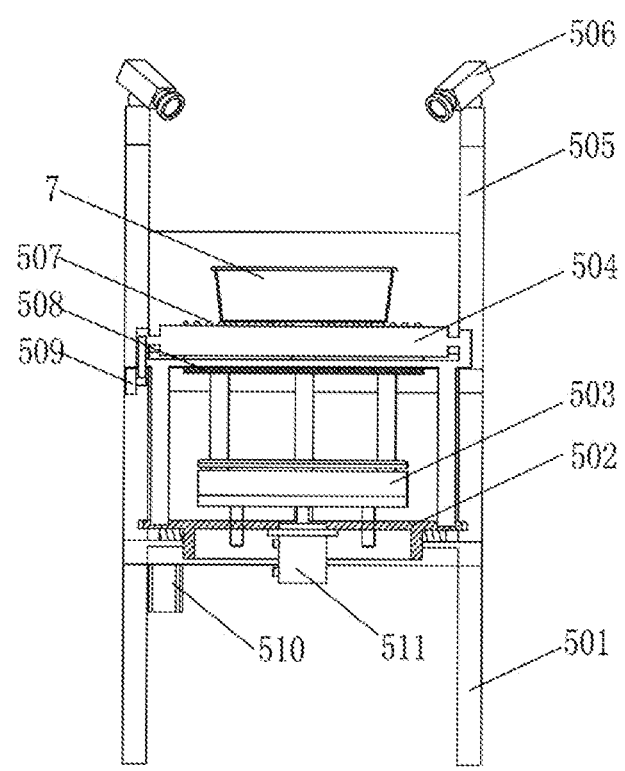
FIG. 2 shows the structure of the inspection module taken from one side.
Figure 3:
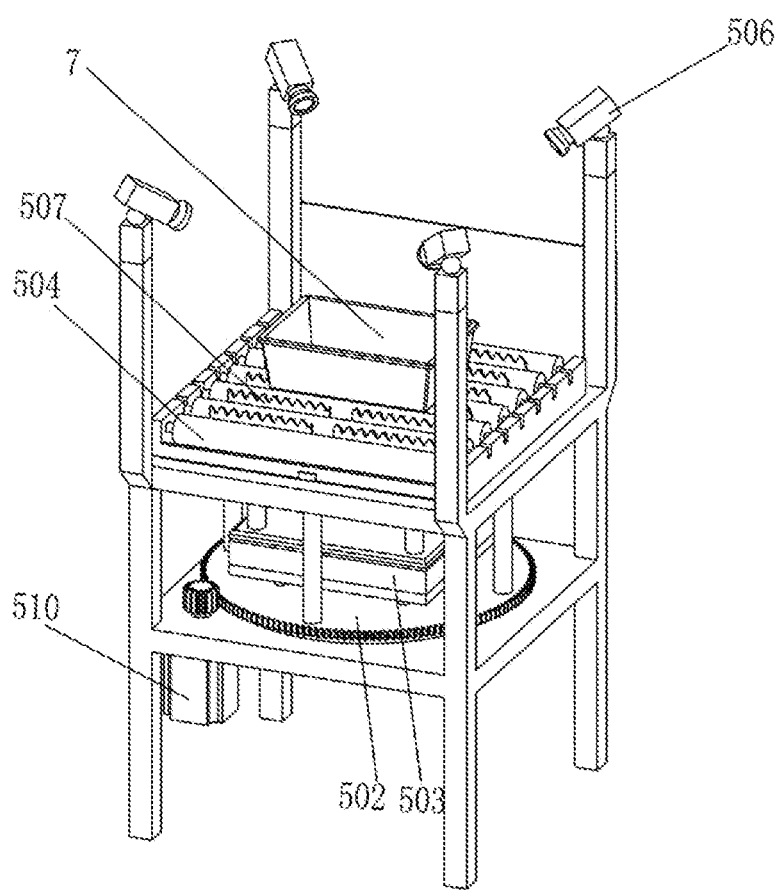
FIG. 3 shows the schematic view of the inspection module with the toothed disk raised.
Figure 4:
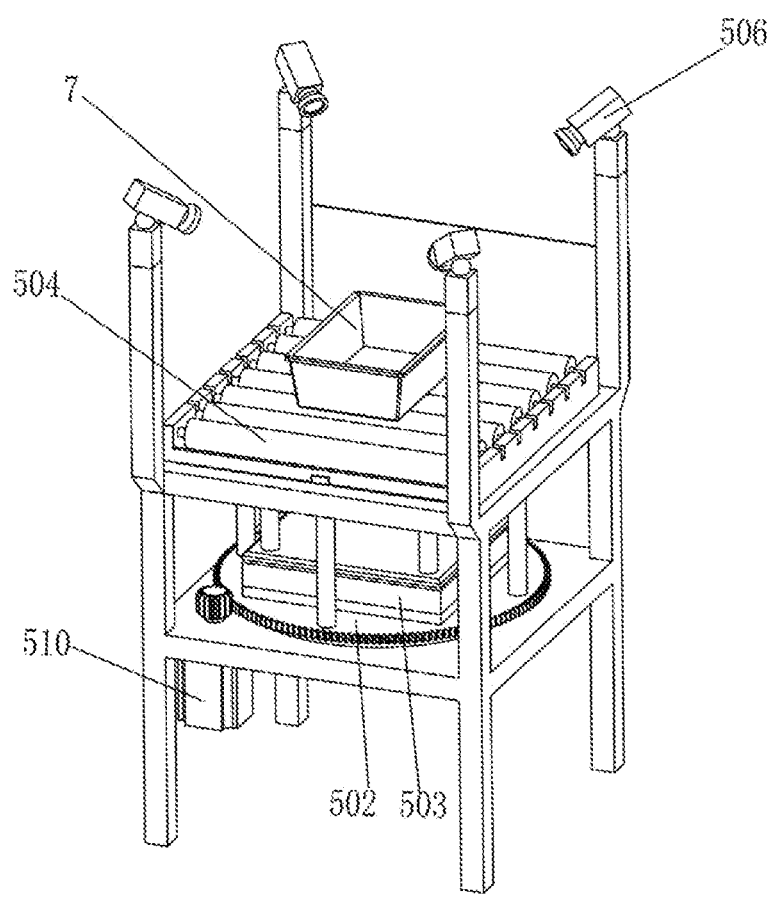
FIG. 4 shows the schematic view of the inspection module with the toothed disk returned.
Figure 5:
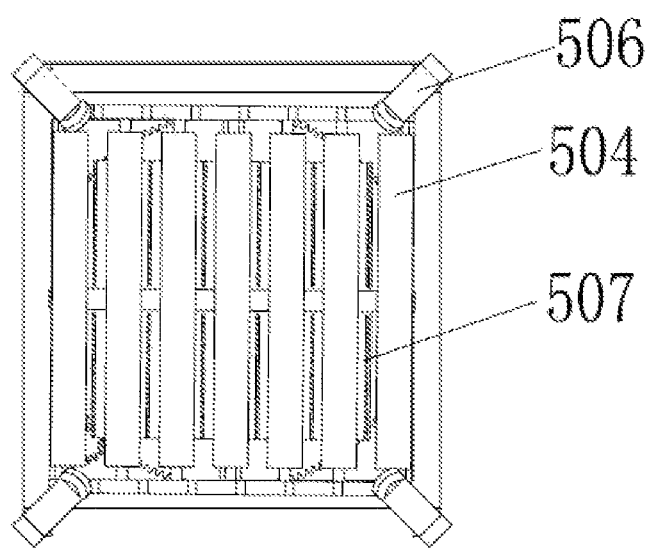
FIG. 5 shows the top view of the inspection module of the present invention.
Figure 6:
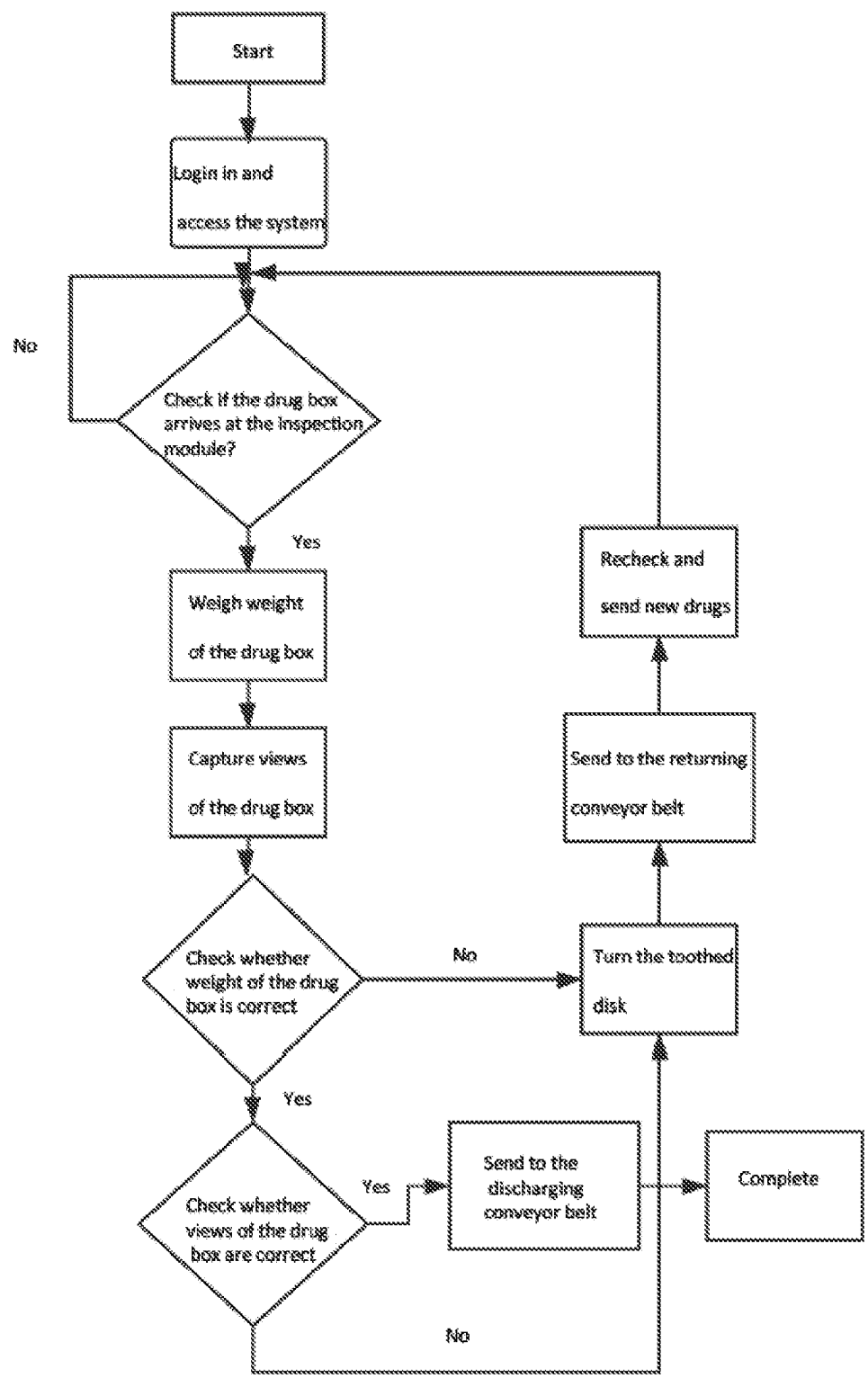
FIG. 6 shows the flowchart of the inspection process of the present invention.

All various elements in the figures are shown as follows: 1. Feeding conveyor belt; 2. Discharging conveyor belt; 3. Returning conveyer belt; 4. Computer; 5. Inspection module; 6. Fan-shaped gradient intersection part; 7. drug box; 501, Supporting structure 502. Toothed disk; 503. Weighing scale; 504. Drive roller; 505. Supporting rod; 506. Camera; 507. Sawtooth shaped strip; 508. Weighing scale; 509. Drive motor; 510. Servo motor; 511. Stretchable device.

The technical scheme of the embodiments of the present invention will be further described in detail in combination with accompanying drawings and specific embodiments.

Embodiment 1: an highly efficient and intelligent drug and parenteral nutrition product automatic collation and reversion device comprises a feeding conveyor belt 1, a discharging conveyor belt 2, a returning conveyer belt 3 and computer 4; and in the junction of the feeding conveyor belt 1, the discharging conveyor belt 2 and the returning conveyer belt 3 is provided an inspection module 5, which comprises a supporting structure 501, and at the four corners of the supporting structure 501 are provided 4 cameras 506; on the first layer of the supporting structure 501 are provided several drive rollers 504, to one side of the said drive rollers 504 are connected the drive motor 509, and the assembly of the drive rollers 504 is connected to the circular toothed disk 502 on the second layer of the supporting structure 501; on top of the toothed disk 502 is provided the weighing scale 503; top part of the weighing scale 503 is connected to the scale pan 508, and to the lower part of the weighing scale 503 is provided a stretchable device 511, which goes through the toothed disk 502 and is connected to the bottom of the supporting structure 501; one side of the toothed disk 502 is connected to a servo motor 510.

In particular, on the scale pan are provided several sawtooth shaped strips 507, with each of them placing between two neighboring drive rollers 504.

In particular, it is possible to adjust number of drive rollers 504 and sawtooth-shaped strips 507 by the dimension of the drug box to be inspected.

In particular, the number of the drive rollers 504 is 7 and the number of the sawtooth-shaped strips 507 is 6.

In particular, the angle of the cameras 506 may be adjusted and orient to the center of the drive rollers 504.

In particular, between the returning conveyor belt 3 and the inspection module 5 is provided a fan-shaped gradient intersection part 6.

In particular, the toothed disk 502 may rotate 90 degree clockwise or counterclockwise.

A highly efficient and intelligent drug and parenteral nutrition product automatic collation and reversion method according to the present invention, which includes the following steps:

S1) put the drugs to be dispatched in drug box 7 and put it on the feeding conveyor belt 1;

S2) when the drug box 7 arrives at the inspection module 5, it stops and the weighing scale rises up, after which, the drug box 7 will leave the drive rollers 504 and contact only the sawtooth shaped strips 507, and the weighing scale 503 will send the weighed value to the computer 4 to compare; in the meantime, at the four corners of the inspection module 5 four cameras 506 are provided to give auxiliary check, by identifying the drugs from different views; compare the drugs with the computer 4 and only when both the weight and view identification are correct, the computer 4 will give instructions to lower the scale pan 508, and put the drug box 7 back in contact with the drive rollers, which will run and send the drug box to the discharging conveyor belt; and when any error is detected, after the scale pan 508 is lowered, the drive rollers will be turned 90 degrees by the toothed disk, run and send the drugs to the returning conveyor belt to return to the original position and notify the person in charge to check again.

Embodiment 2: the present embodiment differs from the embodiment 1 only in that it is possible to adjust the number of the drive rollers 504 and sawtooth shaped strips on the scale pan 508 according to the dimension of the drug box 7 to be inspected. When the drug box 7 to be inspected is big, by increasing the size of the inspection module 5 and correspondingly number of drive rollers 504 and sawtooth shaped strips 507 on the scale pan 508, it is possible to adapt to the size of the drug box 7.

Embodiment 3: the present embodiment differs from the embodiment 1 in that there is no fan-shaped gradient intersection part 6 provided between the returning conveyer belt 3 and the inspection module 5, and in this manner, the returning conveyor belt will not return the drug box to the drug dispatching area but to any desired inspection position.

It is intelligible to those skilled in the art that, the present invention is not limited to the details of the embodiments described above. And the present invention can be implemented in other concrete forms without deviating the spirit or basic features of the present invention.

In addition, it should be understood that although the present specification has been described in terms of an implementation, the present specification is not limited thereto, but not every implementation only comprises an independent technical solution, and the description mode of the specification is only for the sake of clarity, a person skilled in the art should use the specification as a whole, and the technical solutions in the embodiments can also be appropriately combined, to form other embodiments that can be understood by a person skilled in the art.

The invention claimed is:

1. A highly efficient and intelligent drug and parenteral nutrition product automatic collation and reversion device, wherein the highly efficient and intelligent drug and parenteral nutrition product automatic collation and reversion device comprises a feeding conveyor belt, a discharging conveyor belt, a returning conveyer belt and computer; and in the junction of the feeding conveyor belt, the discharging conveyor belt and the returning conveyer belt is provided an inspection module, which comprises a supporting structure, and at four corners of the supporting structure are provided 4 cameras; on the first layer of the supporting structure are provided several drive rollers, to one side of the said drive rollers are connected the drive motor, and the assembly of the drive rollers is connected to a circular toothed disk on the second layer of the supporting structure; on top of the toothed disk is provided a weighing scale; top part of the weighing scale is connected to a scale pan, and to the lower part of the weighing scale is provided a device, which goes through the toothed disk and is connected to the bottom of the supporting structure; one side of the toothed disk is connected to a servo motor, wherein on the scale pan are provided several sawtooth shaped strips, with each of them placed between two neighboring drive rollers.

2. The highly efficient and intelligent drug and parenteral nutrition product automatic collation and reversion device of the claim 1, wherein the number of the drive rollers is 7 and the number of the sawtooth-shaped strips is 6.

3. The highly efficient and intelligent drug and parenteral nutrition product automatic collation and reversion device of the claim 1, wherein the angle of the cameras may be adjusted and orient to the center of the drive rollers.

4. The highly efficient and intelligent drug and parenteral nutrition product automatic collation and reversion device of the claim 1, wherein between the returning conveyor belt and the inspection module is provided a fan-shaped gradient intersection part.

5. The highly efficient and intelligent drug and parenteral nutrition product automatic collation and reversion device of the claim 1, wherein the toothed disk may rotate 90 degree clockwise or counterclockwise.

6. The highly efficient and intelligent drug and parenteral nutrition product automatic collation and reversion device of the claim 1, wherein the number of the drive rollers is 7 and the number of the sawtooth-shaped strips is 6.

* * * * *